United States Patent Office 3,413,280
Patented Nov. 26, 1968

3,413,280
MONOAZO DYESTUFFS
René de Montmollin, Riehen, and Henri Riat, Arlesheim, Switzerland, assignors to Ciba Limited, Basel, Switzerland, a Swiss company
No Drawing. Continuation-in-part of application Ser. No. 247,495, Dec. 27, 1962. This application Apr. 15, 1964, Ser. No. 360,136
Claims priority, application Switzerland, Dec. 29, 1961, 15,175/61
7 Claims. (Cl. 260—196)

This is a continuation-in-part of our co-pending application Ser. No. 247,495 filed Dec. 27, 1962, now abandoned.

The present invention provides new, valuable monoazo dyestuffs of the formula (1) 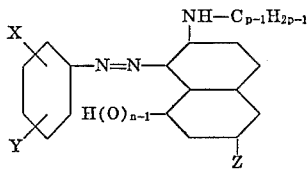

in which X represents a hydrogen atom or a sulfonic acid group or a carboxyl group, Y represents an α-halogen-acrylamino group, Z represents a sulfonic acid amide group, $n$ represents a positive integer not greater than 2 and $p$ represents a positive integer not greater than 3.

The invention provides, in particular, those dyestuffs of the formula

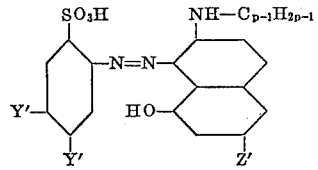

in which Z' represents a sulfonic acid amide group alkylated and/or arylated at the nitrogen atom, one Y' represents a hydrogen atom and the other Y' represents an α-halogenacrylamino radical, and $p$ represents an integer not greater than 3.

The new monoazo dyestuffs can be made by coupling diazo compounds prepared from amines of the formula (3) 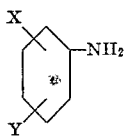

in which X and Y have the meanings ascribed to them in Formula 1, with coupling components of the formula

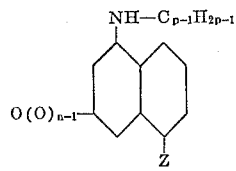

in which $n$, $p$ and Z have the meanings ascribed to them in Formula 1.

Amines of the Formula 3 which may be mentioned are, for example, the condensation products of 1 mol of an anhydride or a chloride of α-chloracrylic acid or α-bromoacrylic acid, and one mol of meta- or para-phenylene diamine, meta- or para-N-alkyl or N-acrylamino aniline, and the corresponding carboxylic acids and especially sulfonic acids, advantageously 1:4-diaminobenzene-2-sulfonic acid and 1:3-diaminobenzene-4-sulfonic acid or N-monosubstituted derivatives thereof that are substituted at the nitrogen atom in $m$- or $p$-position to the sulfo group, for example, N-methyl, ethyl, propyl or isobutyl compounds.

Compounds suitable as starting products for the preparation of amines of the Formula 3 are those that contain an easily acylatable amino group, for example, a monoalkylamino group and also a less easily acylatable primary amino group or a nitro group, which compounds, after the acylation, can be diazotized or reduced and diazotized. As less easily acylatable amino groups there may be mentioned more especially those that are in a position vicinal to an acidic group, for example, a sulfonic acid group.

Coupling components of the Formula 4 which may be used are 2-amino-8-hydroxynaphthalene-6-sulfonic acid amides or 2-aminonaphthalene-6-sulfonic acid amides that couple in 1-position, for example, primary sulfonic acid amides, sulfonic acid-N-monoalkylamides, especially sulfonic acid-N-monomethyl-amide, sulfonic acid-N-monoethyl-amide, sulfonic acid-N-monopropylamide or sulfonic acid-N-monoisobutylamide, and identical or different sulfonic acid-N-dialkylamides that contain such alkyl radicals, sulfonic acid-N-arylamides, such as sulfonic acid-N-phenylamide or sulfonic acid - N - 2':6' - dimethylphenylamide or advantageously, for example, sulfonic acid-N-methyl - N-phenylamide, sulfonic acid-N-β-hydroxyethyl-N - phenylamide, sulfonic acid - N - methyl-N-2'-carboxyphenylamide or sulfonic acid-N-morpholide; other suitable coupling components of the Formula 4 which may be mentioned are the corresponding 6-sulfonic acid amides of 2-N-methyl- or ethylamino-8-hydroxynaphthalene or of 2-N-methyl- or ethylaminonaphthalene.

The diazotization of the amines serving as starting materials in the present process can be carried out by methods in themselves known, for example, with the aid of mineral acids, especially hydrochloric acid and sodium nitrite, or by the methods generally used for compounds that are difficult to diazotize, for example, with the aid of nitrosyl-sulfuric acid. In the last-mentioned case, it is often of advantage to precipitate the diazo compounds, for example, by diluting the diazotized mixture with water, filtering and coupling in that form. The coupling is carried out in an acid medium, for example, in a medium slightly acidic to Congo Red or in a medium acidified with acetic acid. It is often of advantage to neutralize the free mineral acid that is formed during the coupling reaction, for example, with sodium acetate. During the diazotization, coupling and isolation of the resulting dyestuffs, care should be taken to ensure that the reactive unsaturated acylamino group remains intact.

A modification of the process of the invention consists in condensing finished dyestuffs of the Formula 1, in which X, Z, $p$ and $n$ have the meanings ascribed to them in the said formula and Y represents an acylatable amino group, with suitable acylation agents, especially chlorides or anhydrides of α-halogenacrylic acids as mentioned in the description of the amines of the Formula 3. The preparation of the aminoazo dyestuffs used as starting products in this process can be effected by hydrolyzing the corresponding acylamino-monoazo dyestuffs or by reducing the corresponding nitromonoazo dyestuffs that are obtained by coupling the coupling components already mentioned with the diazotized acylamino compounds or nitranilines or with the diazotized acylamino- or nitranilinesulfonic or carboxylic acids.

In the process of the invention, the condensation of such aminomonoazo dyestuffs with the aforesaid acylation agents is carried out by methods in themselves known, advantageously in the presence of agents capable of binding acid, such as sodium acetate, sodium hydroxide or sodium carbonate, and under conditions that ensure that the reactive radical to be introduced remains intact, that is to say, for example, in the presence of an organic solvent or at a relatively low to a moderately raised temperature in aqueous medium.

A further modification of the process of the invention consists in using as starting materials dyestuffs of the Formula 1, in which X, Z, $n$ and $p$ have the meanings ascribed to them in that formula, but in which Y, for example, represents a dihalogen-propionylamino group and producing the dyestuffs of the invention from these dyestuffs by splitting off the hydrogen halide. The aforesaid dyestuffs to be used as starting materials can be prepared as described for the two first-mentioned manufacturing processes, that is to say, by coupling or condensation.

In order to split off the hydrogen halide in accordance with the process of the invention, the aforesaid dyestuffs, that contain an $\alpha:\beta$-dihalogen-propionylamino group, are advantageously treated with alkali metal or alkaline earth metal hydroxide, carbonate or bicarbonate at a low to a moderately raised temperature, or with alkali metal or alkaline earth metal acetate at a raised temperature.

Likewise in the two last-mentioned manufacturing processes, care has to be taken to ensure that the fiber-reactive radical remains intact during the various operations and during the subsequent isolation of the dyestuff.

The isolation of the dyestuffs obtained by the processes of the invention is advantageously carried out at a low temperature by salting out and filtration. If necessary, the isolated dyestuffs can be dried after the addition of extenders or stabilizing agents; drying is advantageously carried out at not too high a temperature and under reduced pressure. In certain cases, dry preparations can be made directly, that is to say, without intermediate isolation of the dyestuffs, by spray-drying the whole preparation mixture. By this method there are obtained new, valuable dry preparations that are suitable for the preparation of stock solutions or dyebaths or, if desired, printing pastes.

The dyestuffs obtained by the process of the invention and the modifications thereof are new. They are valuable compounds suitable for dyeing or printing a very wide variety of materials, especially polyhydroxylated materials of fibrous structure, such as materials that contain cellulose or synthetic fibers, for example, those made of regenerated cellulose, or natural materials, for example, cellulose, linen or more especially cotton.

The dyestuffs of the invention are specially suitable for dyeing fibrous materials that contain nitrogen, such as polyamides and polyurethanes, silk, leather and more especially wool, for example, from a weakly acid, neutral or weakly alkaline bath, if necessary, in the presence of the usual assistants, for example, in the presence of condensation products of ethyleneoxide and amines of high-molecular weight. In this manner level full dyeings are obtained on wool possessing a good fastness to light, a good fastness to rubbing and good properties of wet fastness, e.g., fastness to milling and that also exhibit excellent evenness.

Unless otherwise stated, the parts and percentages in the following examples are by weight:

Example 1

125 parts of 30% hydrochloric acid were added to a neutral solution of 201 parts of $4\alpha,\beta$-dichloropropionylamino-2-aminobenzene-1-sulfonic acid in 1000 parts of water, and the mixture was diazotized in the usual manner at 10 to 15° C. with 125 parts by volume of a 4 N sodium nitrite solution. The diazo compound so obtained and which was free from nitrous acid was poured into a suspension prepared by dissolving 172 parts of 2-amino-8-hydroxynaphthalene-6-sulfonic acid - N - methyl-N-phenylamide in 500 parts by volume of an N sodium hydroxide solution and acidifying the solution with 500 parts by volume of 2 N acetic acid. The whole was stirred at 20 to 25° C. until coupling was complete. 450 parts by volume of a 10 N sodium hydroxide solution were then added to the coupling mixture, and the whole stirred for about 3 hours at about 40° C., the $\alpha,\beta$-dichloropropionyl group being converted into a $\alpha$-chloro-acryl group. The dyestuff suspension was then neutralized with about 100 parts by volume of 30% hydrochloric acid until it reacted weakly alkaline (pH about 8). It was then filtered, the dyestuff thoroughly washed with a 2% sodium chloride solution and dried in vacuo at 80 to 90° C. A red powder was obtained which dissolved in hot water and dyed wool or polyamide fibers scarlet red tints fast to wet processing.

Similar dyestuffs, that dyed wool the tints listed in Column III of the following table from a neutral or acetic acid bath were obtained by coupling the diazo and coupling components listed in Columns I and II in the manner described in the above example and converting the resulting dihalogen-propionylamino dyestuffs into the corresponding $\alpha$-halogen-acryl dyestuffs by elimination of hydrogen halide.

When 5-$\alpha,\beta$-dichloro-propionylamino-2-amino-benzene-1-sulfonic acid was used instead of 4-$\alpha,\beta$-dichloro-propionylamino-2-aminobenzene-1-sulfonic acid a similar dyestuff was obtained that dyed wool and polyamide fibers somewhat more bluish red tints.

| | I | II | III |
|---|---|---|---|
| | Diazo Component | Coupling Component | Neutral or acetic acid dyeing on wool |
| 1 | 4-$\alpha,\beta$-dibromo-propionylamino-2-aminobenzene-1-sulfonic acid. | 2-amino-8-hydroxy-naphthalene-6-sulfonic acid anilide. | Scarlet. |
| 2 | do | 2-amino-8-hydroxy-naphthalene-6-sulfonic acid-N-methyl-N-benzylamide. | Do. |
| 3 | do | 2-amino-8-hydroxy-naphthalene-6-sulfonic acid-2':6'-dimethyl-phenylamide. | Do. |
| 4 | do | 2-amino-8-hydroxy-naphthalene-6-sulfonic acid-N-ethyl-N-phenyl-amide. | Do. |
| 5 | do | 2-aminonaphthalene-6-sulfonic acid methyl amide. | Yellow-orange. |
| 6 | 5-$\alpha,\beta$-dichloro-propionyl-amino-2-amino-benzene-1-sulfonic acid. | 2-aminonaphthalene-6-sulfonic acid-N-methyl-N-phenylamide. | Orange. |
| 7 | 5-$\alpha,\beta$-dibromo-propionyl-amino-2-aminobenzene-1-sulfonic acid. | do | Do. |
| 8 | do | 2-amino-8-hydroxy-naphthalene-6-sulfonic acid-N-methyl-N-phenyl-amide. | Red. |
| 9 | 4-$\alpha,\beta$-dibromo-propionylamino-2-aminobenzene-1-sulfonic acid. | do | Scarlet. |
| 10 | do | 2-amino-naphthalene-6-sulfonic acid-N-methyl-N-2'-carboxy-phenyl-amide. | Yellow-orange. |
| 11 | do | 2-amino-8-hydroxy-naphthalene-6-sulfonic acid-N-methyl-N-2'-carboxy-phenylamide. | Do. |
| 12 | do | 2-amino-8-hydroxy-napthalene-6-sulfonic acid-N-2'-carboxy-phenylamide. | Red. |
| 13 | do | 2-n-methylamino-naphthalene-6-sulfonic-acid-N-$\beta$-hydroxy-ethyl-N-phenylamide. | Orange. |
| 14 | do | 2-n-methylamino naphthalene-6-sulfonic-acid-N-methyl-N-2'-carboxy-phenyl-amide. | Do. |
| 15 | 5-$\alpha,\beta$-dibromo-propionylamino-2-benzene-1-sulfonic acid. | do | Orange-red. |

| I | II | III |
|---|---|---|
| Diazo Component | Coupling Component | Neutral or acetic acid dyeing on wool |
| 16 ...... do ...... | 2-n-methylamino-naphthalene-6-sulfonic acid-N-β-hydroxy-ethyl-N-phenylamide. | Do. |
| 17 ...... do ...... | 2-amino-8-hydroxy-naphthalene-6-sulfonic acid-N-2'-carboxyphenylamide. | Red. |
| 18 ...... do ...... | 2-aminonaphthalene-6-sulfonic acid-N-methyl-N-2'-carboxy-phenyl-amide. | Orange. |

DYEING PRESCRIPTION 2 parts of the dyestuff obtained as described in Example 1 were dissolved in 4000 parts of water. 10 parts of crystalline sodium sulfate were added, and 100 parts of well-wetted wool were entered into the dyebath so obtained at 40 to 50° C. 2 parts of 40% acetic acid were then added, the dyebath brought to the boil in the course of ½ hour, and dyeing continued at the boil for ¾ hour. After the dyeing operation, the wool was rinsed with cold water and dried. A scarlet red dyeing fast to washing and having a good fastness to light was obtained.

Example 2

40.2 parts of 4-$\alpha$:$\beta$-dibromopropionylamino-2-amino-benzene-1-sulfonic acid were well stirred into a mixture of 25 parts of $\alpha$-naphthalene sulfonic acid and 500 parts of water, and the whole was diazotized by the slow, dropwise addition of an aqueous solution of 6.9 parts of sodium nitrite.

The diazo solution so obtained, which was free from nitrous acid, was poured into a suspension prepared by dissolving 35.8 parts of 2-amino-8-hydroxy-naphthalene-6-sulfonic acid-N-β-hydroxyethyl-N-phenyl-amide in 200 parts by volume of an N sodium hydroxide solution and acidifying with 200 parts by volume of 2 N acetic acid. The whole was stirred at 20 to 25° C. until coupling was complete. 40 parts by volume of 10 N sodium hydroxide solution were then added to the coupling mixture, and the whole stirred for about 10 minutes, the $\alpha$:$\beta$-dibromo-propionyl group being converted into the bromacryl group. The dyestuff suspension so-treated was then neutralized with 30% hydrochloric acid until it reacted slightly acid (pH about 6). It was then filtered, the dyestuff washed with a 2% sodium chloride solution and dried in vacuo at 80 to 90° C. A red powder was obtained that dissolved in hot water and dyed wool or polyamide fibers yellowish red tints fast to wet processing.

When 5-$\alpha$:$\beta$-dibromo-propionylamino-2-aminobenzene-1-sulfonic acid was used instead of 4-$\alpha$:$\beta$-dibromo-propionyl-amino-2-aminobenzene-1-sulfonic acid, a similar dyestuff was obtained that dyed wool and polyamide fibers somewhat more bluish red tints.

Example 3

40.2 parts of 4-$\alpha$:$\beta$-dibromo-propionylamino-2-amino-benzene-1-sulfonic acid were diazotized as described in Example 2, and the diazo compound so obtained poured into a suspension prepared by dissolving 34.2 parts of 2N-methylamino - 8-hydroxynaphthalene-6-sulfonic acid-N-methyl-N-phenylamide in 200 parts by volume of an N sodium hydroxide solution and acidifying with 200 parts by volume of 2 N acetic acid. The whole was stirred at 20 to 25° C. until coupling was complete. 40 parts by volume of a 10 N sodium hydroxide solution were then added to the coupling mixture, and the whole stirred for about 10 minutes, the $\alpha$:$\beta$-dibromo-propionyl group being converted into the bromacryl group. The dyestuff suspension was then neutralized with 30% hydrochloric acid until it reacted slightly acid (pH about 6). It was then filtered, and the dyestuff washed with a 2% sodium chloride solution and dried in vacuo at 80 to 90° C. A red powder was obtained that dissolved in hot water and dyed wool or polyamide fibers bluish red tints fast to wet processing.

When 5-$\alpha$:$\beta$-dibromo-propionylamino-2-aminobenzene-1-sulfonic acid was used instead of 4-$\alpha$:$\beta$-dibromo-propionylamino - 2 - aminobenzene-1-sulfonic acid, a similar dyestuff was obtained that dyed wool and polyamide fibers red tints with a strong bluish cast.

Example 4

57.1 parts of the dyestuff of the formula

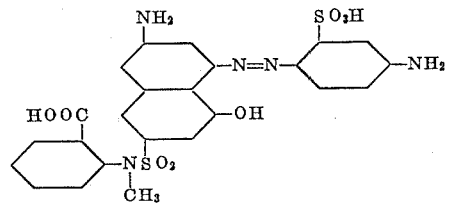

were neutralized in 500 parts of water with a 2 N sodium hydroxide solution, and 16.4 parts of anhydrous sodium acetate added. A solution of 25 parts of $\alpha$:$\beta$-dibromo-propionyl chloride in 100 parts of acetone was then added dropwise at 0 to 5° C. in the course of 30 minutes while stirring vigorously. After a short time the amino group was completely acylated. To the dyestuff suspension were added 30 parts of a 10 N sodium hydroxide solution, the whole was allowed to stand for a short time, and then neutralized by the addition of about 10 parts of 10 N hydrochloric acid. The dyestuff was then precipitated by the addition of sodium chloride, filtered and dried. The dyestuff so obtained dyed wool red tints fast to wet processing and light when applied from a neutral or acetic acid bath.

What is claimed is:

1. A monoazo dyestuff of the formula

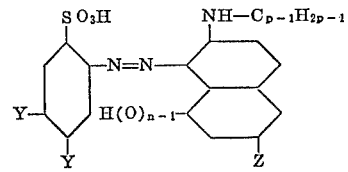

in which one Y represents a hydrogen atom and the other Y represents a member selected from the group consisting of an $\alpha$-chloracrylamino- and an $\alpha$-bromacrylamino group, n represents a positive whole number not greater than 2 and p represents a positive whole number not greater than 3, and Z represents a member selected from the group consisting of a sulfonic acid amide -N-methyl, -N-phenyl, -N-toluyl, -N-xylyl, -N-carboxyphenyl, -N-methyl-N-phenyl, -N-ethyl-N-phenyl, -N-hydroxyethyl-N-phenyl, N-methyl-N-carboxyphenyl and -N-methyl-N-benzyl group.

2. The monoazo dyestuff of the formula

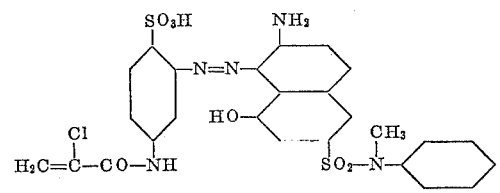

3. The monoazo dyestuff of the formula

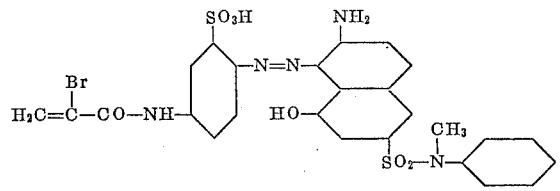

4. The monoazo dyestuff of the formula
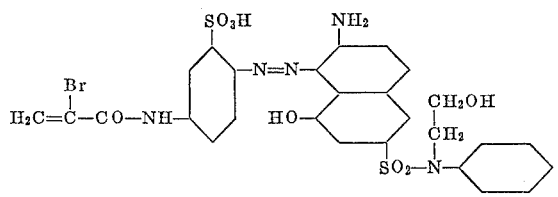
5. The monoazo dyestuff of the formula
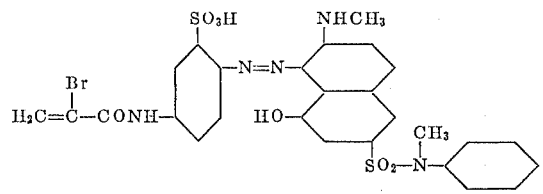
6. The monoazo dyestuff of the formula
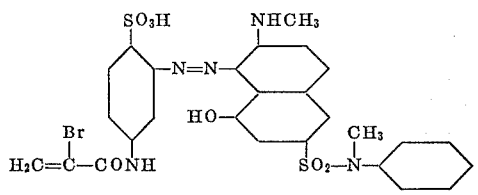
7. The monoazo dyestuff of the formula
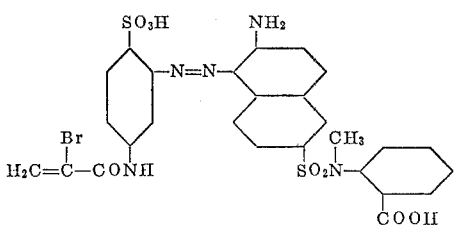
References Cited
UNITED STATES PATENTS
2,931,795  4/1960  Heckendorn et al. ____ 260—199
FOREIGN PATENTS
858,183  1/1961  Great Britain.
CHARLES B. PARKER, *Primary Examiner.*
D. M. PAPUGA, *Assistant Examiner.*